(12) United States Patent
Mattes et al.

(10) Patent No.: US 7,445,072 B2
(45) Date of Patent: Nov. 4, 2008

(54) VEHICLE UPFRONT SENSOR

(75) Inventors: Bernhard Mattes, Sachsenheim (DE); Thomas Herrmann, Oehringen (DE); Rolf-Juergen Recknagel, Jena (DE); Rolf Aidam, Endingen (DE)

(73) Assignee: Robert Bosch GmbH, Stuttgart (DE)

( * ) Notice: Subject to any disclaimer, the term of this patent is extended or adjusted under 35 U.S.C. 154(b) by 264 days.

(21) Appl. No.: 10/504,232

(22) PCT Filed: Sep. 23, 2002

(86) PCT No.: PCT/DE02/03569

§ 371 (c)(1), (2), (4) Date: Feb. 8, 2005

(87) PCT Pub. No.: WO03/066385

PCT Pub. Date: Aug. 14, 2003

(65) Prior Publication Data

US 2005/0116817 A1 Jun. 2, 2005

(30) Foreign Application Priority Data

Feb. 9, 2002 (DE) .................. 102 05 398

(51) Int. Cl.
*B60K 28/10* (2006.01)
(52) U.S. Cl. ..................................... 180/274
(58) Field of Classification Search ............... 280/735; 180/274; 293/4, 117; 73/12.01, 12.08, 865.3, 73/865.6, 12.09; 701/45; 340/436
See application file for complete search history.

(56) References Cited

U.S. PATENT DOCUMENTS

| 4,176,858 A | | 12/1979 | Kornhauser |
| 4,249,632 A | * | 2/1981 | Lucchini et al. ............. 180/274 |
| 5,441,301 A | | 8/1995 | Breed et al. |
| 5,748,075 A | | 5/1998 | Dirmeyer et al. |
| 6,182,782 B1 | * | 2/2001 | Matsuura et al. ............ 180/274 |
| 6,510,914 B2 | * | 1/2003 | Ishizaki et al. ............. 180/274 |
| 6,678,599 B2 | * | 1/2004 | Eisele et al. .................. 701/45 |

FOREIGN PATENT DOCUMENTS

| DE | 39 42 343 | 6/1991 |
| DE | 198 50 851 | 4/2000 |
| DE | 10057258 | 3/2003 |
| EP | 893 309 | 1/1999 |
| EP | 0937612 | 8/1999 |
| EP | 937612 A2 * | 8/1999 |
| EP | 1281582 | 2/2003 |
| JP | 2654428 | 5/1974 |
| WO | WO 00/32449 | 6/2000 |

* cited by examiner

*Primary Examiner*—Paul N. Dickson
*Assistant Examiner*—Robert A. Coker
(74) *Attorney, Agent, or Firm*—Kenyon & Kenyon LLP

(57) ABSTRACT

A vehicle upfront sensor is described that has a cavity and a sensing element therein. A collision is detected as a function of the deformation of the cavity. The sensing element may be designed as a pressure or temperature sensor, the cavity then being largely closed, so that an adiabatic pressure or temperature increase is measurable.

11 Claims, 2 Drawing Sheets

VEHICLE UPFRONT SENSOR

FIELD OF THE INVENTION

The present invention relates to a vehicle upfront sensor.

BACKGROUND INFORMATION

A collision sensor system for motor vehicles is described in European Patent No. 893 309. In this document, a piezoelectric and/or piezoresistive film is proposed as a collision sensor.

SUMMARY

One advantage of an example vehicle upfront sensor of the present invention is that a more beneficial, testable collision sensor may be constructed more compactly and is suitable for connection to noise-free interfaces for a central control device.

In one embodiment, the sensing element in the cavity is designed as a pressure or temperature sensor which enables the measurement of adiabatic pressure or temperature increase when there is a deformation of the cavity. This may be an especially rapid sensing method to detect a collision. In this context, the cavity should be largely closed to permit an adiabatic pressure increase. An impact box may be provided for this purpose as a cavity, it also being possible to arrange a plurality of impact boxes in the vehicle front end.

Moreover, it may be advantageous if the cavity extends across almost the entire vehicle width, in particular to also easily recognize pedestrians or individual, narrow elements or even offset accidents.

Furthermore, it may be advantageous if the cavity is made of a plastic so that the bumper fascia, for example, may be used as such a cavity. Moreover, the plastic may be flexible so that it will not necessarily be broken or otherwise destroyed in response to an impact, but will resume its original shape. In particular, it may be advantageous if the cavity is designed to be waterproof to prevent corrosion of the sensing element.

Finally, it may be advantageous if the upfront sensor with the cavity and sensing element is connected via a current interface to a central control device for restraining means, so that the control device evaluates the sensor signals.

BRIEF DESCRIPTION OF THE DRAWINGS

Exemplary embodiments of the present invention are illustrated in the Figures and explained in detail below.

DETAILED DESCRIPTION OF EXAMPLE EMBODIMENTS

Bumper contact sensors are, for example, used for pedestrian impact detection, among other things. In accordance with the present invention, an upfront sensor is provided that is outfitted with a cavity in the front end of the vehicle, a sensing element that detects an impact as a function of the cavity deformation being provided in the cavity. Such indirect deformation sensing elements may be, for example, pressure or temperature sensors that evaluate the adiabatic pressure or temperature increase.

Figure 1:
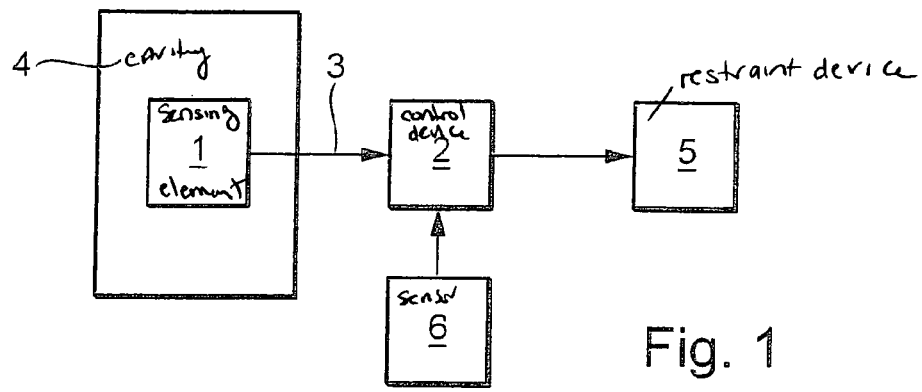
FIG. 1 shows a block diagram of an example upfront sensor of the present invention that is connected to a control device.

FIG. 1 shows a block diagram of an example upfront sensor of the present invention that is connected to a control device. In this embodiment, the upfront sensor has a sensing element 1 that has the actual sensor, the evaluation electronics, and a transmitter that transmits the evaluated or processed sensor data via a line 3 to a control device 2. Sensing element 1 is housed within a cavity 4. This cavity 4 is largely closed, so that an increase in adiabatic pressure or temperature may develop when the cavity is deformed. The cavity is disposed in the area of the bumper, the cavity itself being made of a plastic. Alternatively, it is possible to also use metal, for example, a thin sheet metal. Parts of the electronics of sensing element 1 may also be located outside the cavity. Moreover, it is possible for control device 2 to be disposed within cavity 4 as well. Here, sensing element 1 is connected via line 3 to control device 2. In this context, a power-line transmission is implemented via line 3. That is, the sensor data are modulated on a D.C. current that is itself used to supply power to sensing element 1. Alternatively, sensing element 1 in cavity 4 may be connected to a bus.

In addition to the upfront sensor of the present invention, other sensors capable of detecting a collision with a pedestrian may also be connected to airbag control device 2. For this purpose, sensor 6 is connected here to control device 2. This sensor 6 is capable of generating signals indicating the effect of a pedestrian impact on a hood front part, the vehicle acceleration or speed, and the time signature of these sensor signals. Airbag control device 2 then evaluates the signals to recognize whether a pedestrian was detected in the front. Control device 2 is then connected to a restraint device 5 which are used in this case especially to protect detected pedestrians. For example, the hood is raised, or exterior airbags are deployed. Airbag control device 2 may also be connected to other sensors for impact detection and additional restraining means, which are intended to protect the vehicle occupants. They have been omitted here for the sake of simplicity.

Alternatively, it is also possible to use other deformation sensors mounted in the cavity instead of the temperature or pressure sensor for sensing the adiabatic pressure increase. In this context, for example, sensors may be used that directly sense the bending of the cavity, such as optical sensors that react to the bending of a light guide. The temperature sensor for the adiabatic temperature increase has the great advantage of simple testability, which may be achieved by a heating current.

Figure 2:
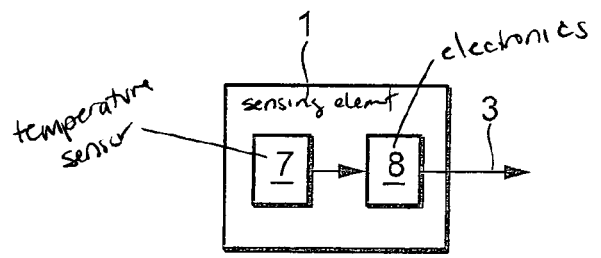
FIG. 2 shows a block diagram of the sensing element.

FIG. 2 shows sensing element 1 as a block diagram. Temperature sensor 7 in this context is connected to electronics 8, which boost and digitize the measuring signal of the temperature sensor and transmit it via line 3. In a further development, the temperature signal may already be evaluated in electronics 8. A processor or an ASIC may be used for this. The configuration is described as in FIG. 2 for other sensors as well, like the pressure sensor.

Figure 3:
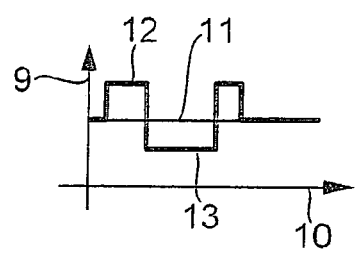
FIG. 3 shows data transmitted by the upfront sensor.

FIG. 3, by way of example, shows how the data is modulated on the D.C. current that is used for supplying power to the sensor. The current is plotted as Y-axis 9, while time is plotted as X-axis 10. Using a D.C. current 11 transmitted from the control device to sensing element 1, modulations 12 and 13 are carried out which impress the sensor information on this D.C. current. In addition to the D.C. interface that impresses the D.C. current to line 3, control device 2 also has a receiver module that detects and accepts modulations 12 and 13 as information. Alternatively, bi-directional data transmission is possible, and time slots may be provided for this purpose.

Figure 4:
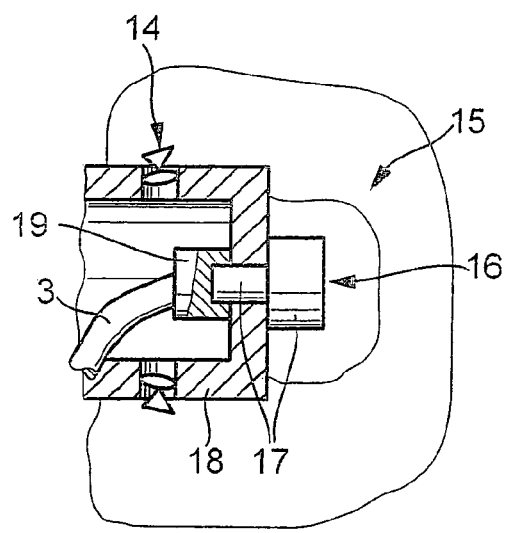
FIG. 4 shows an exemplary embodiment of the upfront sensor of the present invention.

FIG. 4 shows a schematic representation of an exemplary embodiment of the upfront sensor of the invention. A plastic bumper fascia 15 forms a hollow space or hollow spaces 16 which act as a cavity. The plastic bumper fascia 15 is mounted via a plastic bumper catch 14. A sensor, in this case the sensing element, is mounted in hollow space 16 using plug 17. A mating connector leads line 3 to the sensing element having plug 17. The attachment using plug and mating connector is mounted on a metal core 18. Sensor 17 is designed in a water-tight housing having a water-tight plug, and it withstands the temperature in the front engine compartment area which is approximately 105° C.

Figure 5A:
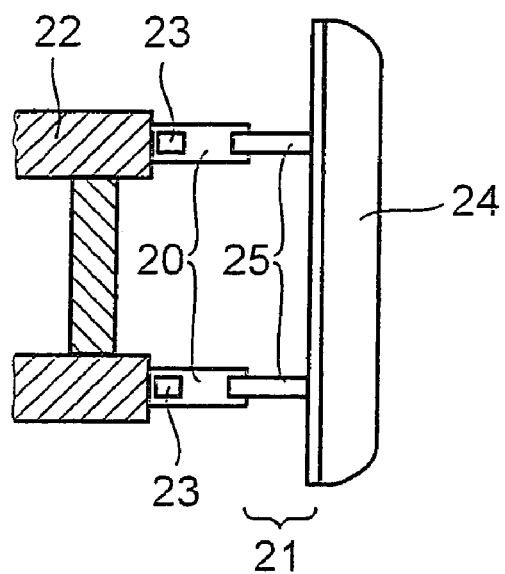
FIGS. 5a and 5b show an assembly including impact boxes.
Figure 5B:
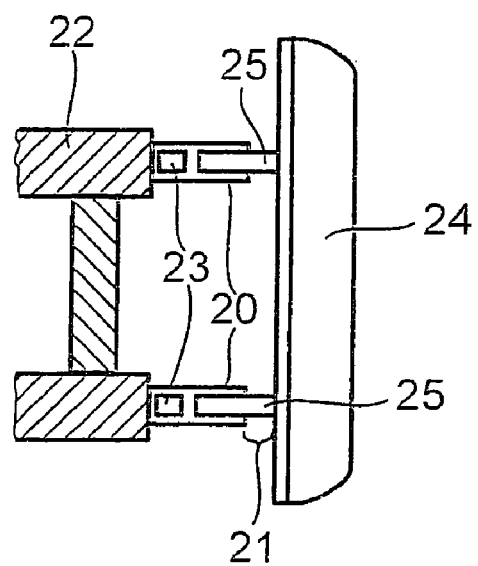

When cavity 16 is subdivided into, for example, three or more smaller individual cavities, each having an installed sensor, it is possible to pinpoint the pedestrian impact location. In this context, the individual sensing elements within the cavities are then connected to control device 2 via individual lines or via a common bus to control device 2. These multiple sensors, which are mounted in the bumper fascia hollow spaces or under the front part of the hood, may then be pre-evaluated by a pedestrian impact electronics circuit, and only a single pre-processed pedestrian impact signal may be transmitted to central airbag triggering unit 2. That means that when there are multiple sensing elements 1 within cavities 4, their signals are jointly evaluated within common evaluation electronics, for example, a microcontroller, and only this signal is then transmitted to control device 2. This can simplify the outfitting of vehicles or even the integration of this pedestrian impact sensing concept. FIG. 5a and FIG. 5b show the assembly with impact boxes before and after a collision. Illustrated in FIG. 5a on longitudinal and transverse members 22 are impact boxes 20 having sensors 23, each impact box accommodating a bumper holder 25. Bumper holders 25 are part of a bumper 24 having an outer skin, foam and mount. A pedestrian protection zone 21 is defined by a distance from the end of impact boxes 20 to bumper 24. Illustrated in FIG. 5b is the same configuration as in FIG. 5A. However, a collision has now occurred so that bumper holders 25 are driven into impact boxes 20, so that the pedestrian protection zone 21 was shortened by the length to which they are driven in.

The invention claimed is:

1. A vehicle sensor, comprising:
    an upfront sensor having at least one cavity, each cavity having a sensing element therein, the upfront sensor detecting an impact via the sensing element as a function of a deformation of the cavity, each sensing element being a temperature sensor, the cavity being sealed so that an adiabatic pressure increases and a temperature increases in response to a deformation of the cavity,
    wherein the sensor is capable of modulating data onto a D.C. current on a transmission line used to transmit power to the sensing element.

2. The sensor as recited in claim 1, wherein the upfront sensor is a contact sensor.

3. The sensor as recited in claim 1, wherein the cavity extends across almost an entire vehicle width.

4. The sensor as recited in claim 1, wherein a surface which at least partially forms the cavity is made of a plastic.

5. The sensor as recited in claim 1, wherein the cavity is watertight.

6. The sensor as recited in claim 1, wherein the upfront sensor is connectable via a current interface to a control device for a restraining device.

7. The sensor as recited in claim 1, wherein the cavity is an impact box that accommodates a bumper holder that can be driven into the impact box to cause the deformation of the cavity.

8. The sensor of claim 1, further comprising: a control device capable of, in response to sensor data from the sensing element, taking an action to protect a pedestrian.

9. The sensor of claim 8, wherein the action to protect the pedestrian includes at least one of: raising a hood of a vehicle, or deploying an exterior airbag.

10. The sensor of claim 1, further comprising: electronics to boost, digitize and transmit a signal from the sensing element.

11. A vehicle sensor, comprising:
    an upfront sensor having at least one cavity, each cavity having a sensing element therein, the upfront sensor detecting an impact via the sensing element as a function of a deformation of the cavity, each sensing element being a temperature sensor, the cavity being sealed so that an adiabatic pressure increases and a temperature increases in response to a deformation of the cavity,
    wherein the sensor is capable of bidirectional data communication to and from the sensing element, the bidirectional data communication involving the assignment of time slots for communicated data.

* * * * *